(12) United States Patent
Hippler et al.

(10) Patent No.: US 12,615,136 B2
(45) Date of Patent: Apr. 28, 2026

(54) CONTROLLING ACCESS TO A MOTOR VEHICLE

(71) Applicant: Bayerische Motoren Werke Aktiengesellschaft, Munich (DE)

(72) Inventors: Marco Hippler, Munich (DE); Thorsten Knott, Tuntenhausen (DE); Lukas Reinhart, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 101 days.

(21) Appl. No.: 18/810,631

(22) Filed: Aug. 21, 2024

(65) Prior Publication Data

US 2025/0106008 A1     Mar. 27, 2025

(30) Foreign Application Priority Data

Sep. 21, 2023     (DE) ..................... 10 2023 125 695.5

(51) Int. Cl.
H04L 9/08     (2006.01)
B60R 25/24     (2013.01)
H04L 9/32     (2006.01)

(52) U.S. Cl.
CPC ............ H04L 9/0825 (2013.01); B60R 25/24 (2013.01)

(58) Field of Classification Search
CPC ... H04L 9/0825; H04L 9/25–34; B60R 25/24; B60R 25/35–36
See application file for complete search history.

(56) References Cited

U.S. PATENT DOCUMENTS

| | | | | |
|---|---|---|---|---|
| 11,677,547 B1* | 6/2023 | McDonald | ............ | H04L 9/3247 |
| | | | | 713/171 |
| 2006/0048228 A1* | 3/2006 | Takemori | ............ | H04L 63/0823 |
| | | | | 713/168 |
| 2015/0052352 A1* | 2/2015 | Dolev | .................. | H04L 9/3278 |
| | | | | 713/156 |
| 2020/0052905 A1* | 2/2020 | Mathias | ................ | H04L 9/0861 |
| 2021/0250355 A1* | 8/2021 | Galdo | .................. | G06F 21/335 |

(Continued)

FOREIGN PATENT DOCUMENTS

WO     WO 2023/137757 A1     7/2023

OTHER PUBLICATIONS

German-language Search Report issued in German Application No. 10 2023 125 695.5 dated Jul. 8, 2024 with partial English translation (10 pages).

(Continued)

*Primary Examiner* — Oleg Survillo
(74) *Attorney, Agent, or Firm* — Crowell & Moring LLP

(57)     ABSTRACT

A digital key provides security for use of a motor vehicle. A method for delivering a digital key such as this from a sender to a recipient includes steps of a secret of the sender being deposited with a manufacturer service; a key created by the recipient being signed by the sender; the signed key being relayed to the recipient; an input for the secret by the recipient being acquired; the key and the input being relayed from the recipient to a tracking service; the input being relayed from the tracking service to the manufacturer service; the manufacturer service determining that the input and the secret match; a consent being relayed from the manufacturer service to the tracking service; and an attestation being relayed from the tracking service to the recipient.

10 Claims, 3 Drawing Sheets

(56)          References Cited

U.S. PATENT DOCUMENTS

| | | |
|---|---|---|
| 2022/0131685 A1 | 4/2022 | Lim et al. |
| 2024/0421984 A1* | 12/2024 | Lim ........................ H04L 9/088 |
| 2025/0104497 A1* | 3/2025 | Hippler ................... H04W 4/40 |
| 2025/0167986 A1* | 5/2025 | Knott .................... H04L 9/3263 |
| 2025/0340182 A1* | 11/2025 | Furchner ............. B60R 25/2018 |
| 2025/0385786 A1* | 12/2025 | Hippler ................ H04L 9/0861 |

OTHER PUBLICATIONS

"Car Connectivity Consortium Digital Key Release 3", Technical Specification, Version 1.1.0 (CCC-TS-101), Jul. 20, 2022, pp. 1-24, 45-47, 123-154 (45 pages).

* cited by examiner

100

130        135        140        145

105

110        115               125        120

CONTROLLING ACCESS TO A MOTOR VEHICLE

CROSS REFERENCE TO RELATED APPLICATION

This application claims priority under 35 U.S.C. § 119 from German Patent Application No. 10 2023 125 695.5, filed Sep. 21, 2023, the entire disclosure of which is herein expressly incorporated by reference.

BACKGROUND AND SUMMARY

The present invention relates to controlling access to a motor vehicle. In particular, the invention relates to creating a digital key to control access to the motor vehicle.

Security for access to a motor vehicle can be provided by means of a digital key. The digital key may be saved on a device. The device and the motor vehicle can reciprocally authenticate one another, and a request to use a predetermined function of the motor vehicle can be performed if authentication is successful. To be more precise, reciprocal authentication can preferably take place on the basis of an asymmetric cryptographic encryption method in which the device and the motor vehicle each have an associated pair comprising a private and a public cryptographic key.

A sender can transfer a permission to use the entire motor vehicle or just a predetermined function to a recipient. A valid key can be created for the recipient by carrying out a predetermined exchange method, which involves communicating with a central instance that can manage keys for the motor vehicle. To document which keys were active with permissions for which functions of a motor vehicle at what time, a tracking service may be implemented. If a key is supposed to be transferred from a sender to a recipient, the key can be deposited with the tracking service, or documented. A freshly created key can obtain validity only when the tracking service has confirmed the key.

Security for a key delivered from a sender to a recipient can be provided by using a two-factor authentication. This can involve the sender notifying the recipient of information that is required in order to obtain the key and of an additional secret on separate channels. Only if the recipient knows the information and the secret is the key able to be created, or confirmed by the tracking service.

Known exchange methods for the secret may be susceptible to certain attacks, in particular to a Janus attack, which can also be called a man-in-the-middle attack.

One object on which the present invention is based is to provide a method that can be used to make the process of creating a digital key that is delivered from a sender to a recipient more secure. The method achieves this object by means of the subjects of the independent claims. Subclaims describe preferred embodiments.

A sender is understood herein to mean a person who is associated with the motor vehicle in a particular manner and who has particular permissions with regard to the motor vehicle. These permissions can include, in particular, stipulating conditions of use or signing a key for the motor vehicle. The sender is a person who is able to collaborate in creating a further digital key in a manner that is described herein.

The motor vehicle can have multiple associated senders at one time. The sender takes action with regard to a control or exchange method described herein by means of a sender device. The sender device preferably comprises a mobile device that is personally associated with the sender, in particular a smartphone, a smartwatch, a smartband, a tablet computer or a laptop computer. To use the sender device for a sensitive action within the framework of a technique described herein, it may be necessary for the sender to authenticate themselves to the sender device. This can be accomplished by virtue of the sender presenting a biometric feature or inputting a secret (password, PIN). The authentication can be checked by an operating system of the mobile device.

A recipient is understood herein to mean a person to whom a permission to use the motor vehicle is supposed to be granted. The recipient, like the sender, is normally a natural person. In another embodiment, a sender or a recipient may also be formed by a device, however. The recipient preferably takes action with regard to a technique described herein by means of a recipient device that is preferably personally associated with them, as is the sender device with the sender. The recipient can also authenticate themselves to their recipient device in order to initiate a security-sensitive operation within the framework of a technique described herein.

A service is preferably provided by a computer or a server. The service can reside in a cloud and be reached by way of a communication network. The communication network may be partly wireless and in particular comprise a mobile radio network. Services may likewise be networked among one another, either wirelessly or by wire.

To simplify matters, the text that follows refers to a sender or a recipient communicating with a service, even though the communication in each case is, strictly speaking, handled by a device. The sender can accomplish this by using a sender device, and the recipient by using a recipient device. An exception, to which specific reference will also be made, relates to the acquisition of an input from the recipient as a person on the recipient device. A sender device, or a recipient device, communicates with another device preferably wirelessly, for which purpose in particular a mobile radio network or a direct transmission by means of radio waves can be used.

A digital key provides security for use of a motor vehicle. A first method for delivering a digital key such as this from a sender to a recipient comprises steps of a secret of the sender being deposited with a manufacturer service; a key created by the recipient being signed by the sender; the signed key being relayed to the recipient; an input for the secret by the recipient being acquired; the key and the input being relayed from the recipient to a tracking service; the input being relayed from the tracking service to the manufacturer service; the manufacturer service determining that the input and the secret match; a consent being relayed from the manufacturer service to the tracking service; and an attestation being relayed from the tracking service to the recipient.

Should it be determined that the input and the secret do not match, the consent may not be relayed to the tracking service and the attestation from the tracking service to the recipient may not take place. Access to the motor vehicle on the basis of the created key may be denied.

The digital key can relate in particular to a technique known as Digital Car Key. A specification for such a key, or for create and exchange methods for creating, checking or transferring keys, is published for example in the public standard Digital Key Release 3 from the Car Connectivity Consortium, which is available in Version 1.1.0 dated Jul. 20, 2022 at the time of this document being created. The digital key, or Digital Car Key, is configured to permit a motor vehicle to be used by only a person who is able to present a digital key that has an assigned permission to perform the function. What is referred to as the sender herein may be referred to as the owner in said standard, and what is called the recipient herein may be referred to as the friend in said standard.

The method is able, in an improved manner, to prevent an attacker from carrying out a Janus attack and intercepting the relayed secret. Unauthorized use of the motor vehicle by the attacker can be prevented in an improved manner. A known method described in chapter 11, in particular section 11.3.6, of the cited standard can be taken as a basis for this. The proposed amendment is straightforward and an achievable gain in security may be large. The first method can be called trackKeyCall.

The manufacturer service can also be called the OEM server, vehicle OEM or vehicle OEM server, for example. The tracking service can also be called the friend device server, for example, and can carry out tracking of keys for one or more vehicles. Complete documentation of keys for the motor vehicle may be a legal requirement or necessary for other reasons, for example to obtain insurance protection. It should be noted that one or more transmission services that may be known as routing servers may also be involved in a communication described herein.

Once the key and the attestation are presented at a motor vehicle, use of the motor vehicle can be approved. Preferably, the attestation needs to be presented only if the motor vehicle is being used for the first time. For subsequent uses, it may be sufficient to present only the digital key. In some embodiments, the attestation can also be relayed to the motor vehicle by a different route. This may involve the tracking service or the manufacturer service relaying a wireless message to the motor vehicle. Should a transmission by this route be disrupted, relay by way of the recipient can be selected.

The sender can relay an invitation to create the key to the recipient after the manufacturer service has confirmed that the secret has been deposited. The sender can also deposit the invitation to create the key with an exchange service; and relay access information for the exchange service to the recipient. The exchange service can also be called the relay server.

The access information and the secret are preferably each transmitted from the sender to the recipient by way of different communication paths. Illustrative communication paths comprise e-mail, Bluetooth, WLAN, mobile radio, SMS or a messenger service such as WhatsApp or Signal. The information and the secret can be expressed as character strings and, in one embodiment, are sufficiently compact to also permit oral or written relay. The recipient can input the applicable information manually on their recipient device or can scan it from a document by means of a camera, for example.

The recipient can create the key on the basis of the invitation. The invitation may be required in order to create the key and may comprise cryptographic information of the sender, for example.

If it is determined that the input and the secret do not match, a further attempt at inputting the correct secret can be initiated. This can involve a repetition prompt being relayed from the manufacturer service to the tracking service and from there to the recipient. A fresh input from the recipient can be acquired and relayed to the manufacturer service by way of the tracking service. There, the match between the fresh input and the secret can be determined and the remainder of the method can continue to be performed. Optionally, more than one other opportunity to input the correct secret can also be provided. By way of example, a total of three inputs can be processed. Should none of the inputs be correct, performance of the rest of the method can be denied. Obtaining the key may then require the method to be carried out again.

A second method for delivering a digital key described herein comprises steps of a secret of the sender being deposited with a manufacturer service; an input for the secret by the recipient being acquired; the input being relayed from the recipient to a tracking service; a key created by the recipient being signed by the sender; the signed key being relayed to the recipient; the input being relayed from the tracking service to the manufacturer service; the manufacturer service determining that the input and the secret match; a consent being relayed from the manufacturer service to the tracking service; an attestation being relayed from the tracking service to the manufacturer service; the attestation being signed by the manufacturer service; and the attestation being deposited with the tracking service.

Should it be determined that the input and the secret do not match, the method may not be continued, and so ultimately a working key for accessing the motor vehicle cannot be generated. The second method comprises an alternative approach to the first method and can afford similar advantages. Here too, a Janus attack can be prevented in an improved manner. The second method can be called SendPINCall.

According to another aspect of the present invention, a system comprises a manufacturer service and a tracking service that are configured to carry out a method described herein. The system can also comprise a sender device and/or a recipient device that are each configured to participate in a method described herein. In some embodiments, the method is also performed using a further network component, in particular an exchange service (relay server) and/or a transmission service (routing server).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
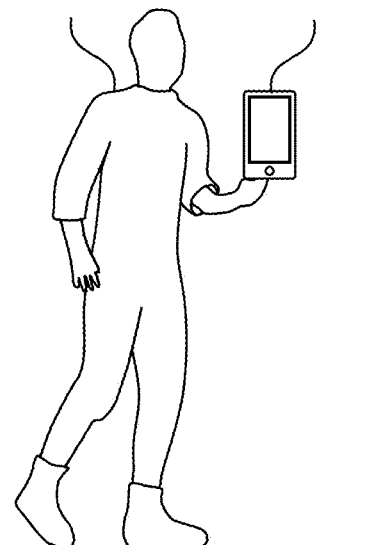
FIG. 1 illustrates a system.
Figure 1:
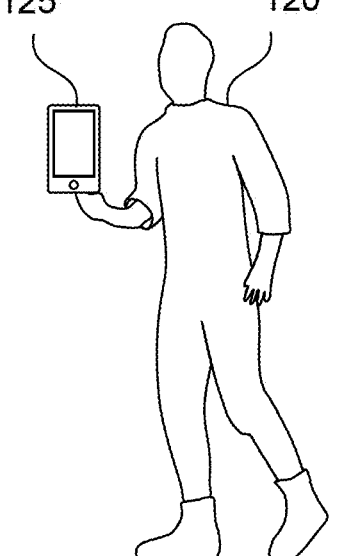

FIG. 1 shows a system 100 for controlling access to a motor vehicle 105. The system 100 is preferably configured to operate according to the specifications of Digital Car Key. This can involve a multiplicity of methods being performed that may relate to different aspects or functions of a Digital Car Key. Methods described herein relate to the creation and transfer of a digital key from a sender 110 of the motor vehicle 105 to a recipient 120.

The sender 110 uses a sender device 115 and the recipient 120 uses a recipient device 125. The devices 115, 125 are associated with the persons 110, 120 and may preferably be realized in the form of smartphones. For the sake of better comprehension, the text that follows refers to the sender 110 or the recipient 120 performing an action, even if, on a technical level, this is accomplished using a sender device 115 or a recipient device 125. Activities that come down to the action of a person 110, 120 are explicitly identified. The devices 115, 125 may be comprised by the system 100, but the persons 110, 120 may not.

The system 100 can comprise an optional exchange service 130 (relay server), a manufacturer service 135 (OEMs server), an optional transmission service 140 (routing server) and a tracking service 145 (friend device server).

The manufacturer service 135 is configured to manage keys for the motor vehicle 105. Optionally, the manufacturer service 135 can also manage data associated with the motor vehicle 105, or relating to the motor vehicle 105, for example with respect to a person who is the driver or passenger of the motor vehicle 105.

The exchange service 130 is configured to receive information and to make it available at an access address. Different pieces of information may be separated from one another, and so each access address can lead only to precisely the deposited information. The transmission service 140 can essentially forward data traffic, for example in the manner of a router or proxy server, although data are not passed through but rather are deposited and need to be fetched by a recipient.

The tracking service 145 is configured to track what digital keys are active for the motor vehicle 105. A history can be created for each generated key, said history being able to indicate in particular from when to when the key is or was valid or to whom the key was issued and when. From a technical point of view, it is possible to ensure that a created key can be used for the purpose of using the motor vehicle 105 only when the key is being tracked by the tracking service 145.

Figure 2:
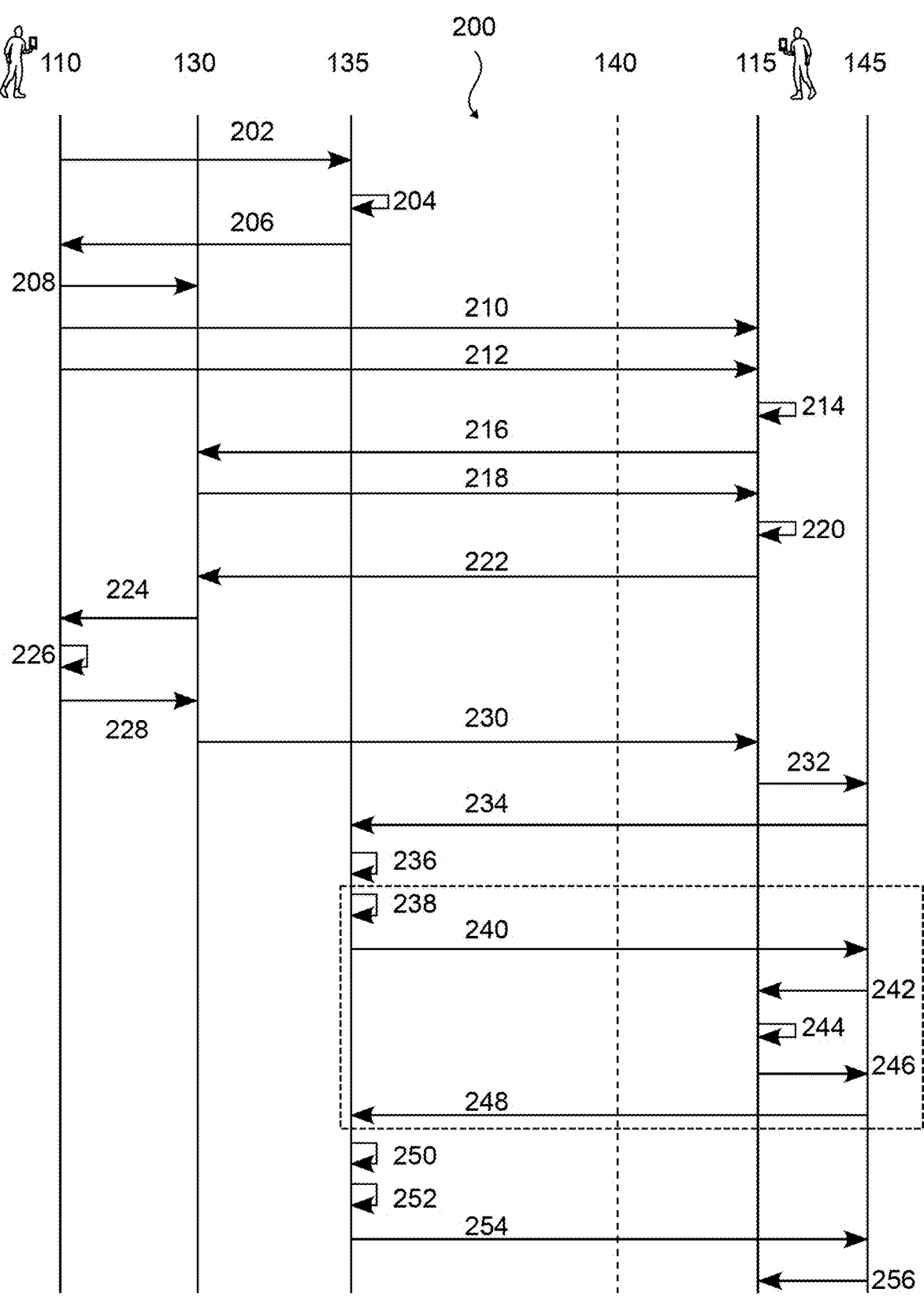
FIG. 2 illustrates a flowchart for a first method.

FIG. 2 shows a flowchart for a first method 200 for a sender 110 to create a digital key for a recipient 115. The first method 200 may be an extension, or variation, of a known method for transferring a digital key. The method shown can differ from a known method in particular in steps 202 to 206 and 234 to 250.

In a step 202, the sender 110 can deposit verification information with the manufacturer service 135. The verification information can comprise an identification of the recipient 115 in order to prevent later access by a different person. Additionally, a secret that the sender 110 may have stipulated can be deposited. The secret can comprise in particular a numerical sequence or character string.

In a step 204, the secret can be stored with the manufacturer service 135. The verification information can likewise be stored. In a step 206, the manufacturer service 135 can confirm the successful storage to the sender 110. The latter can create a mailbox with the exchange service 130 in a step 208. The mailbox can be used for depositing a request to create a key to the recipient 115.

In a step 210, an invitation to access the exchange service 130 can be relayed from the sender 110 to the recipient 115. In a step 212, the sender 110 can relay the previously created secret to the recipient 115. Different communication channels can be used for the invitation and the secret, for example using Messenger and using SMS.

In a step 214, an input by the recipient 115 following the prompt to input the secret can be acquired. At this juncture, the person of the recipient 115 can act by reading the received secret in the recipient device 125 and manually inputting it into their recipient device 125. For the present method, it is not the input but rather the acquisition of the input that is crucial.

In a step 216, the recipient 115 can navigate to the address that the invitation contains, which refers to the mailbox. In a step 218, the recipient 115 can take the request to generate a key from the mailbox at the exchange service 130. On the basis of the request, the recipient 115 can create a key for themselves in a step 220 in order to use the motor vehicle 105. The created key is not yet complete, however.

In a step 222, the recipient 115 can relay the created key to the exchange service 130, which can relay it to the sender 110 in a step 224. The sender 110 can sign the key in a step 226 and then relay it to the exchange service 130 together with a prompt to import. The signed key and the prompt can be stored in a step 228 in the mailbox already used previously. The request can be forwarded to the recipient 115 in a step 230.

In a step 232, the recipient 115 can relay the key to the tracking service 145. The tracking service 145 can internally store information about the key and send a confirmation to the manufacturer service 135 in a step 234. The confirmation can comprise the secret acquired in step 214. In a step 236, the input can be compared with the secret stored in step 204. Should the input and the secret match, the method can continue with a step 250.

Otherwise, a step 238 can comprise determining that the input and the secret do not match. A corresponding response, or message, can be relayed from the manufacturer service to the tracking service 145 in a step 240. The tracking service 145 can forward corresponding advice to the recipient 115 in a step 242. The recipient can make a fresh input of the secret in a step 244. The above statements in regard to step 214 apply to this step and the input can be acquired in step 244. In a step 246, the input can be forwarded to the tracking service 145. In a step 248, the tracking service 145 can relay a message to the manufacturer service 135, which message may correspond to the message in step 234, albeit here on the basis of the freshly acquired input.

In a step 250, the manufacturer service 135 can determine that the secret and the input match. Accordingly, the manufacturer service 135 can sign an attestation in a step 252 and can relay it to the tracking service 145 in a step 254. The tracking service can record the process and forward the attestation to the recipient 115 in a step 256.

In a step that is not shown, the recipient 115 can present the created and signed key and the attestation at the motor vehicle 105, and the motor vehicle 105 can permit use of a predetermined function.

Figure 3:
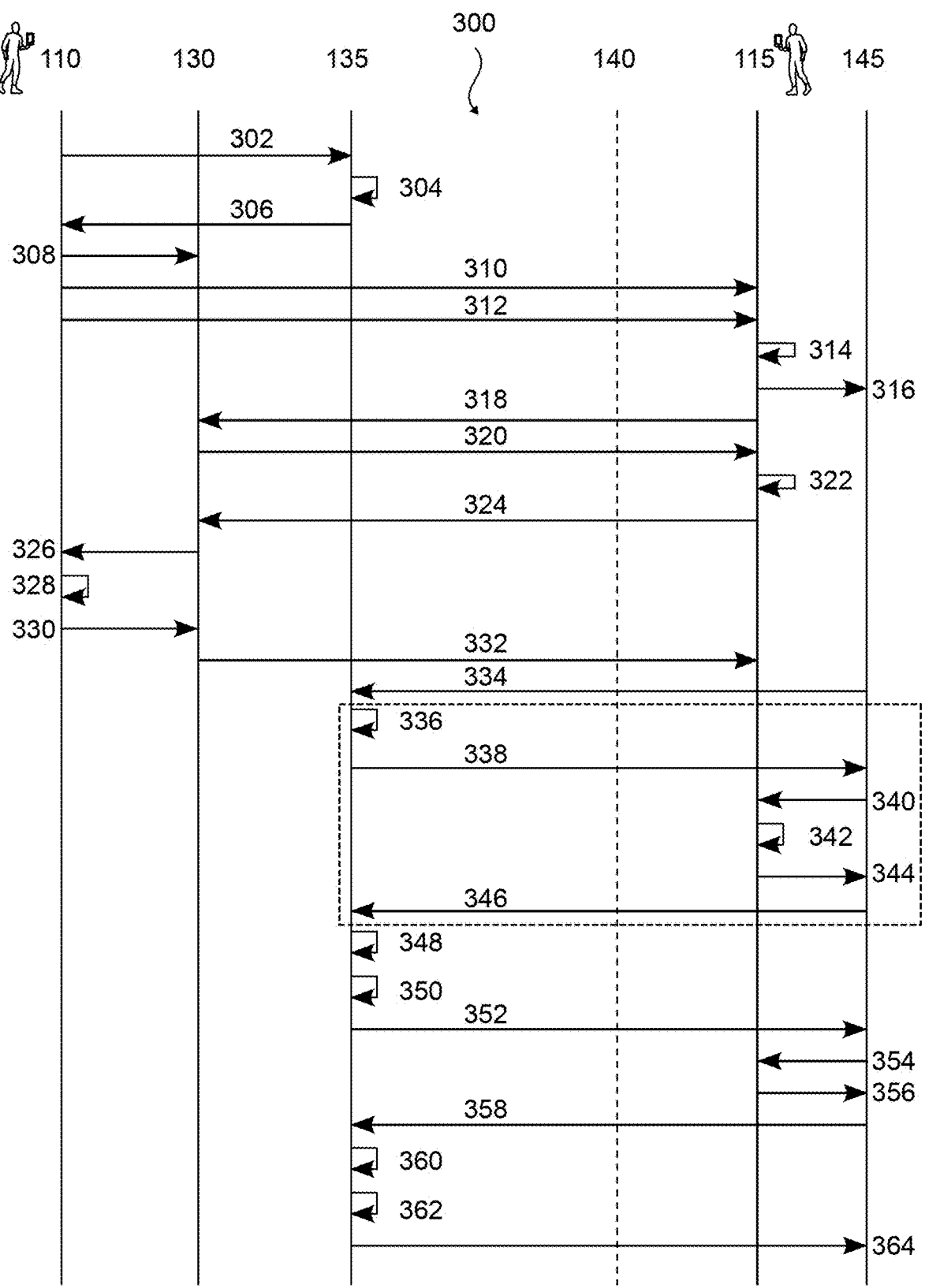
FIG. 3 illustrates a flowchart for a second method.

FIG. 3 shows a second method 300 that can be performed as an alternative to the method 200. The second method 300 begins in a similar way to the first method 200, and steps 302 to 314 can correspond in pairs to steps 202 to 214.

Next, a step 316 can comprise the acquired input being routed from the recipient 115 to the tracking service 145. In a step 318, the recipient 115 can access the previously created mailbox at the exchange service 130 and, in a step 320, can download the request deposited there for generating a key.

In a step 322, the recipient 115 can take the prompt as a basis for generating a digital key. In a step 324, the generated key, together with a request to sign, can be relayed from the recipient 115 to the exchange service 130, and from there to the sender 110 in a step 326. The sender 110 can sign the key in a step 328 and, in a step 330, relay it, together with a request to import, to the exchange service 130. From there, the key and the prompt can be routed to the recipient 115 in a step 332. In a step 334, the input from the recipient 115 can be relayed from the tracking service 145 to the manufacturer service 135.

Should the manufacturer service 135 determine, in a step 336, that the input and the stored secret are not identical, the recipient 115 can be provided with another opportunity to input the secret. This can be accomplished by sending an appropriate message to the tracking service 145 in a step 338. The tracking service 145 can prompt the recipient 115, in a step 340, to specify a fresh input. The input can be acquired in a step 342 and relayed to the tracking service 145 in a step 344. The input can be relayed, in a step 346, from the tracking service 145 to the manufacturer service 135, which can compare it with the stored secret again. These steps can also be performed multiple times if the input still does not match the secret and the recipient 115 is intended to be provided with yet other opportunities to input the correct secret.

In a step 348, the manufacturer service 135 can determine that the input and the secret match. In a step 350, the input can be stored and, in a step 352, advice that the input and the secret match can be sent to the tracking service 145. In a step 354, the tracking service 145 can notify the recipient 115 about the successful verification. In a step 356, the recipient 115 can send a request to the tracking service 145 to track the key. The tracking service 145 can then store information about the key locally and, in a step 358, deliver a notification about tracking of the key having been performed to the manufacturer service 135.

In a step 360, the manufacturer service 135 can look up information that it stored locally in step 304 and can take said information as a basis for signing an attestation in a step 362. The signed attestation can be relayed to the tracking service 145 in a step 364.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

| Reference signs | |
|---|---|
| 100 | system |
| 105 | motor vehicle |
| 110 | sender |
| 115 | sender device |
| 120 | recipient |
| 125 | recipient device |
| 130 | exchange service |
| 135 | manufacturer service |
| 140 | transmission service |
| 145 | tracking service |
| 200 | first method |
| 202 | relay secret and verification information |
| 204 | store secret |
| 206 | confirm storage |
| 208 | create mailbox |
| 210 | relay invitation |
| 212 | relay secret by way of separate channel |
| 214 | acquire input |
| 216 | take up sharing URL |
| 218 | request to generate a key |
| 220 | generate key |
| 222 | request to sign the key |
| 224 | request to sign the key |
| 226 | sign key |
| 228 | request to import the key |
| 230 | request to import the key |
| 232 | track key |
| 234 | track key |
| 236 | compare input and deposited secrets |
| 238 | input and secret are not identical |
| 240 | track response key |
| 242 | advice of incorrect input secret |
| 244 | acquire input, second attempt |
| 246 | relay input |
| 248 | track key |

-continued

| Reference signs | |
|---|---|
| 250 | input and secret are identical |
| 252 | sign attestation |
| 254 | track response key |
| 256 | attestation |
| 300 | second method |
| 302 | relay secret and verification information |
| 304 | store secret |
| 306 | confirm storage |
| 308 | create mailbox |
| 310 | relay invitation |
| 312 | relay secret by way of separate channel |
| 314 | acquire input |
| 316 | relay secret |
| 318 | redeem sharing URL |
| 320 | request to generate a key |
| 322 | generate key |
| 324 | request to sign the key |
| 326 | request to sign the key |
| 328 | sign key |
| 330 | request to import the key |
| 332 | request to import the key |
| 334 | relay secret |
| 336 | compare input and deposited secrets; not identical |
| 338 | advice of incorrect input secret |
| 340 | acquire input, second attempt |
| 342 | relay input |
| 344 | relay input |
| 346 | relay input |
| 348 | input and secret match |
| 350 | save |
| 352 | advice: input and secret are identical |
| 354 | notify |
| 356 | track key |
| 358 | track key |
| 360 | look up stored verification information |
| 362 | sign attestation |
| 364 | relay attestation |

What is claimed is:

1. A method for delivering a digital key, from a sender to a recipient, to securely use a motor vehicle, the method comprising the steps of:

a secret of the sender is deposited with a manufacturer service;

the sender signs a key created by the recipient;

the signed key is relayed to the recipient;

an input for the secret by the recipient is acquired;

the key and the input are relayed from the recipient to a tracking service;

the input is relayed from the tracking service to a manufacturer service;

the manufacturer service determines that the input and the secret match;

a consent is relayed from the manufacturer service to the tracking service; and an attestation is relayed from the tracking service to the recipient.

2. The method according to claim 1, further comprising:

presenting the key and the attestation at the motor vehicle; and approving use of the motor vehicle.

3. The method according to claim 2, wherein the attestation needs to be presented only when the motor vehicle is being used for a first time.

4. The method according to claim 1, wherein the sender sends an invitation to create the key to the recipient after the manufacturer service has confirmed that the secret has been deposited.

5. The method according to claim 1, wherein the sender deposits an invitation to create the key with an exchange service; and the sender sends access information for the exchange service to the recipient.

6. The method according to claim 5, wherein the access information and the secret are each relayed from the sender to the recipient by way of different communication paths.

7. The method according to claim 6, wherein the recipient creates the key on the basis of the invitation.

8. The method according to claim 1 wherein when it is determined that the input and the secret do not match, a repetition prompt is relayed from the manufacturer service to the tracking service and from the tracking service to the recipient;

a fresh input from the recipient is acquired and relayed to the manufacturer service by way of the tracking service; and the match between the fresh input and the secret is determined.

9. A method for delivering a digital key, from a sender to a recipient, to securely use a motor vehicle, the method comprises the steps of:

a secret of the sender is deposited with a manufacturer service;

an input for the secret by the recipient is acquired;

the input is relayed from the recipient to a tracking service;

a key created by the recipient is signed by the sender;

the signed key is relayed to the recipient;

the input is relayed from the tracking service to the manufacturer service;

the manufacturer service determines that the input and the secret match;

a consent is relayed from the manufacturer service to the tracking service;

an attestation is relayed from the tracking service to the manufacturer service;

the attestation is signed by the manufacturer service; and the attestation is deposited with the tracking service.

10. A system comprising:

a memory storing instructions of a manufacturer service and a tracking service that, when executed by a computer processor, are configured to carry out the acts of:

deposit a secret of the sender with the manufacturer service;

a signed key, created by a recipient, is relayed to the recipient;

an input for the secret by the recipient is acquired;

the key and the input are relayed from the recipient to the tracking service;

the input is relayed from the tracking service to the manufacturer service;

the manufacturer service determines that the input and the secret match;

a consent is relayed from the manufacturer service to the tracking service; and an attestation is relayed from the tracking service to the recipient.

* * * * *